Feb. 13, 1940.  T. SENDZIMIR  2,190,490
STRUCTURAL MATERIAL
Filed April 22, 1937  3 Sheets-Sheet 1

INVENTOR.
TADEUSZ SENDZIMIR.
BY Allen & Allen
ATTORNEYS.

Feb. 13, 1940.	T. SENDZIMIR	2,190,490
STRUCTURAL MATERIAL
Filed April 22, 1937	3 Sheets-Sheet 2
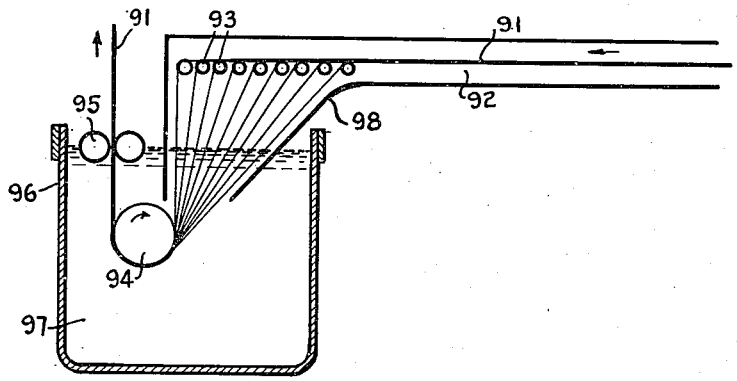
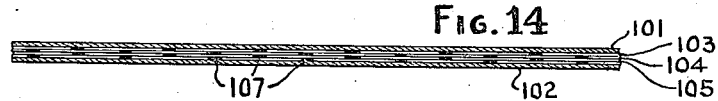
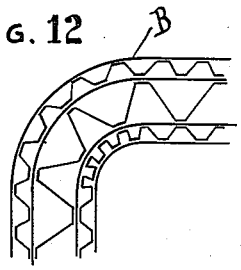
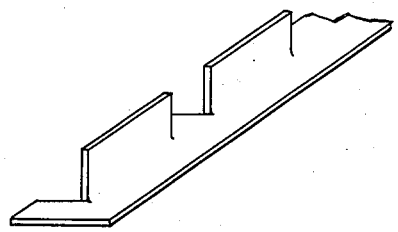
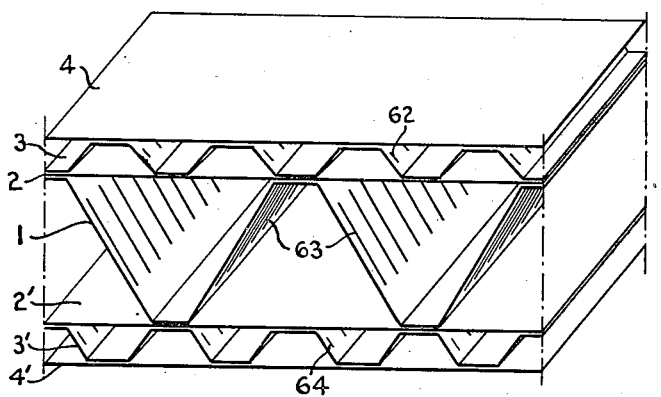
INVENTOR.
TADEUSZ SENDZIMIR.
BY
Allen & Allen
ATTORNEYS.

Feb. 13, 1940.                T. SENDZIMIR                 2,190,490
                           STRUCTURAL MATERIAL
                         Filed April 22, 1937          3 Sheets-Sheet 3
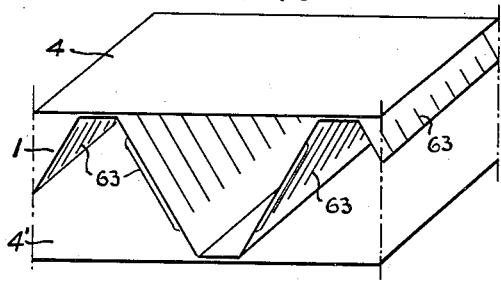
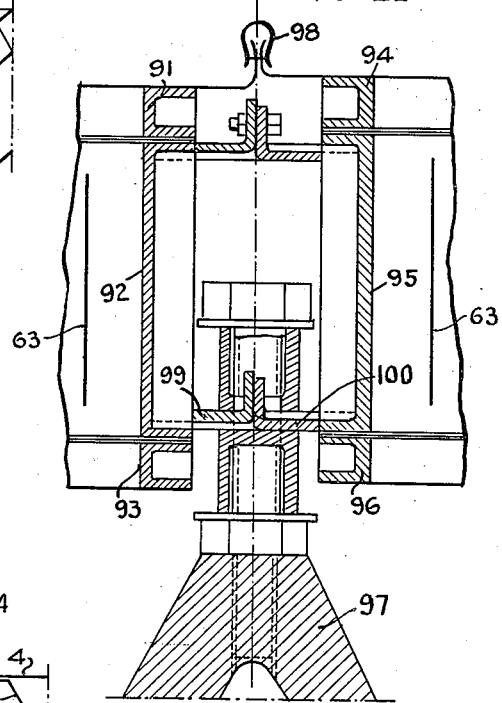
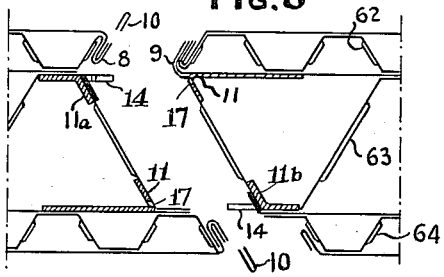
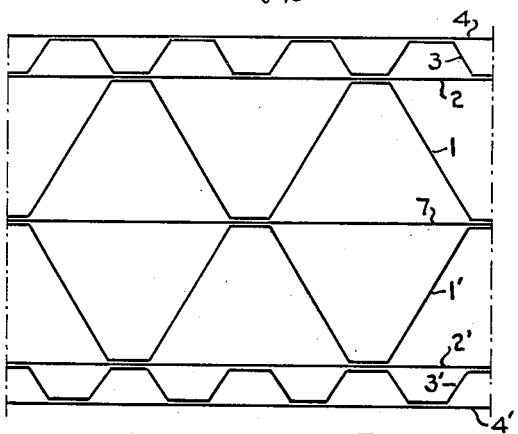
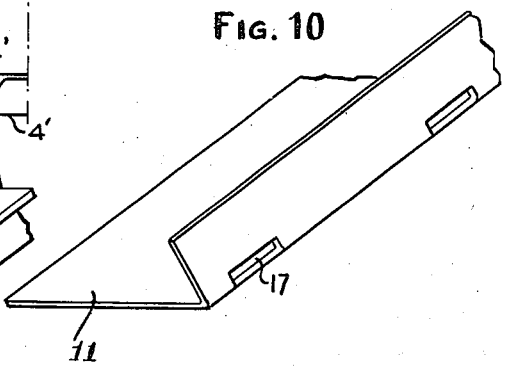
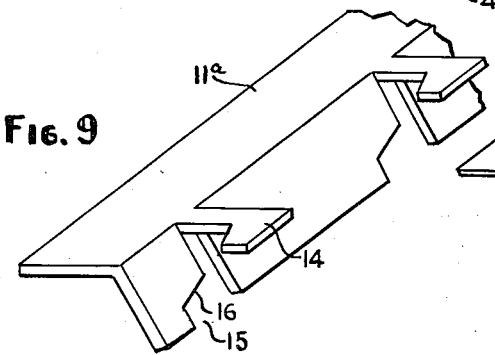
INVENTOR.
TADEUSZ SENDZIMIR.
BY Allen & Allen
ATTORNEYS.

Patented Feb. 13, 1940

2,190,490

UNITED STATES PATENT OFFICE 2,190,490

STRUCTURAL MATERIAL

Tadeusz Sendzimir, Paris, France, assignor to The American Rolling Mill Company, Middletown, Ohio, a corporation of Ohio Application April 22, 1937, Serial No. 138,431

12 Claims. (Cl. 189—34)

My invention has to do with structural materials which will in most instances be made of metal, and will be so described in certain exemplary embodiments; but it will be understood that the aspect of the invention as hereinafter claimed is not so limited and is applicable to other materials, such as cellulose, paper, veneer, Bakelite, asbestos and other sheet-like materials.

An object of the invention is to provide a structural material of almost universal application, of light specific weight, and having a high mechanical resistance in all directions. Another object is to provide a material through which heat and sound penetrate only with difficulty, and which resist corrosion. A further object is to provide a material that can stand a very considerable deformation before breaking.

These and other objects of my invention which will be pointed out hereinafter or will be apparent to one skilled in the art upon reading these specifications, I accomplish by that certain construction and arrangement of parts, and in that process of which I shall now describe certain exemplary embodiments. Reference is made to the drawings wherein:

Figures 5, 6 and 7 show other forms of structural elements.

Figure 8 shows a way in which adjacent structural elements may be joined.

Figures 9 and 10 show means for joining adjacent elements.

Figure 11 shows part of a structure embodying my elements and means for joining them end to end.

Figure 12 shows a curved section formed in one of my elements.

Figure 13 is a diagrammatic illustration in a step of a process of manufacturing my elements.

Figure 14 is a diagrammatic sectional view of the immediate product of the step illustrated in Figure 13.

Figure 15 is a perspective view of a joining and spacing member, as used in the joint shown in Fig. 11.

The multicellular structural elements which are the subject of this application are assemblies of a plurality of preformed pieces of sheet-like material, dividing the space between the two outer surfaces of the element into a relatively great number of individually enclosed cells. The axes of such cells are usually parallel to the greater dimension of the plate and, in cases where resistance to corrosion for almost unlimited periods of time is of first importance, they are subdivided lengthwise each into a number of shorter cells, by inserting or fixing blocking pieces at intervals, as will be more fully described.

Figure 1:
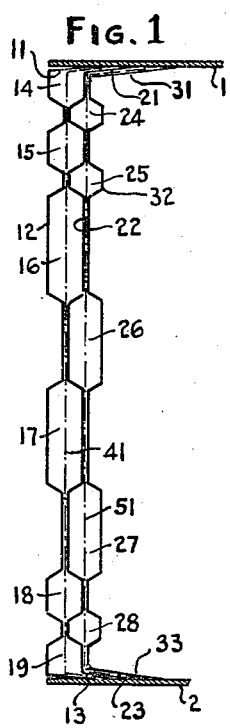
Figure 1 is a partial sectional view across one of my structural elements.

An exemplary form of my structure is indicated in Figure 1, which shows in section three cellule-forming members of such element. Each has in this instance roughly the form of channels and the left-hand one, for example comprises the upper horizontal part 11, the vertical cellule-forming part 12, and the lower horizontal part 13. The central one comprises the upper horizontal part 21, the vertical cellule-forming part 22 and the lower horizontal part 23. These two channels can easily be joined, as by seam or spot welding; and the vertical sections will form cellules 14, 15, 16, 17, 18 and 19. To those two channels, the right-hand one can be attached which likewise comprises the upper horizontal part 31, the vertical cellule-forming part 32 and the lower horizontal part 33. Thus the following cellules will be formed: 24, 25, 26, 27 and 28.

It will be noted that, in case of spot welding, where the electrodes only have access to one side of the sheet, as for instance when welding the middle with the right-hand sheet channels, between the cellules 25 and 26, both electrodes of a spot-welding machine must be applied on the same side, making two welded points each time. Whenever necessary, a metal (copper) liner may be put into a cellule, to facilitate the passage of the current.

In precisely the same manner further sheet-channels may be added making a plate of the required width. The length of the plate may be as great as necessary, and in most instances will only be limited by transportation facilities. For structural elements that are intended for use as walls or floors of houses or in boat construction, for example, sheets of very light gauge are indicated, such as from two to twenty-thousandths of an inch, and a relatively large number of cells across the thickness of the plate, in order to make it heat-insulating as well as soundproof. The individual cells act as air-pockets; heat can move only along the cross section of each sheet and therefore such section has very high heat-insulating properties. This division into a relatively great number of individual cells especially when they are of different cross sections, also makes such structural elements practically soundproof.

Figure 4:
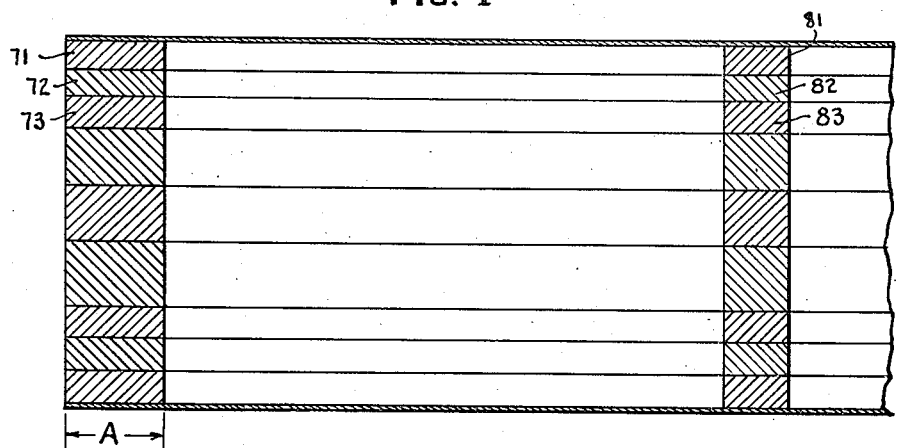
Figure 4 is a sectional view showing an assembly having cell closing elements.
Figure 16:
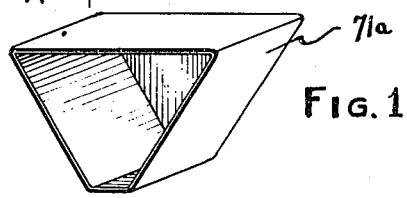
Figure 16 is a perspective view of one form of cell closing element also employed with a means of joining as shown in Fig. 11.

When assembling such a section and welding the individual channels together, blocks of metal may be inserted and solidly welded at spaced intervals, into the individual cells, blocking each cell or subdividing it into a number of shorter cells, each hermetically sealed from the others, as shown at 71—73, 81—83 in Figure 4. Such blocks may be solid blocks of metal, or stampings like Fig. 16, or may consist of another material which is simply pressed between the individual channels and adequately closes or seals each section of a cellule. Such sealing blocks also re-enforce the whole section mechanically and wherever this is important, should be placed so that they always lie on the same cross section of the plate, and so that their stiffening effect is continuous, over the whole section.

The upper and lower horizontal parts of each channel: 11 and 13, 21 and 23, 31 and 33, may be of any width required and their width determines the number that are overlapping and consequently the resistance to bending which the element has. For beauty, and also to prevent outside corrosion, plates like 1 and 2 may be welded on to the outside surfaces of the element, preferably during the assembly and either on one or both sides of the element. They may consist of the same or another metal, in which latter case the metal may have a colour or a surface to produce the necessary artistic or decorative or other effect. Or they, or one of them, may consist of, or be covered with a corrosion resisting metal.

The resistance to bending, for a given weight per unit of surface, depends upon the thickness of the element and on the proportion of metal situated at or near the outside surfaces. From this point of view the present invention offers an almost ideal solution. Whenever the maximum resistance to bending is desired, the outside plates can be made thick and the individual channels overlapping a considerable distance. The inside structure can, in such cases, be made just strong enough to hold the outside portions rigidly and to prevent them from collapsing. For other prevalent combinations of forces, f. i., twisting, crushing, another distribution of metal across its thickness may be preferable, and the method lends itself always to the ready securing of the optimum conditions. It may be desirable, in some cases, to make the outside cellules smaller, and therefore stronger, than the inside ones. This has been shown in Figure 1, where the outside cellules 14, 15, 24, 25 and 18, 19 and 28 are smaller than the inside cellules 16, 17 and 26, 27. It may likewise be desired in some instances to provide between each, or some of the formed channels, plain sheets of the same or, preferably, of a thinner gauge, as shown in the dotted lines 41 and 51 on Figure 1. Such interposed sheets may either be in the form of channels (i. e., bent over at the edges) of the same width as the formed sheet-channels, or they may be in the form of angles and extend only for a certain part of the thickness of the plate, so that they reenforce only the small cellules and do not extend to the middle of the plate.

The cellular sections may or may not be symmetrical. The section shown in Fig. 1 is slightly symmetrical in that it shows four stronger cellules; 14, 15, 24 and 25 in the upper part, and only three similar cellules; 18, 19 and 28 in the lower part. Such disposition may lead to savings in weight. Take first a section like this subject to a bending movement alone. The outer fibres are in such case subject to tension and compression of equal magnitude and therefore should, theoretically speaking, be equally dimensioned. In case of the fibres subject to tension, however, a great safety factor is usually required than in those subject to compression, chiefly because possible cracks, non-metallic inclusions, etc., would weaken fibre subject to tension much more than fibre subject to compression. The necessity of providing for this extra safety factor on tensioned fibres or cellules of the section only, can be taken advantage of, with this invention, by making such sections non-symmetrical.

Figure 2:
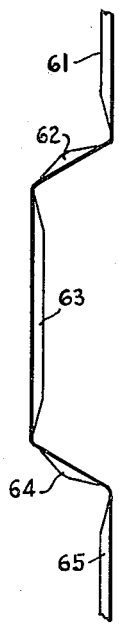
Figures 2 and 3 show a reenforced formed sheet for use in such an assembly as that shown in Figure 1.
Figure 3:
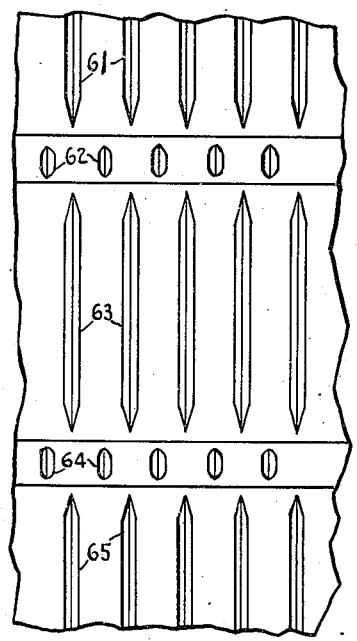

The strength of the cellules may be increased by slightly corrugating the sheet-channels wherever they need stiffening, as shown in Figures 2 and 3, where ribs 61, 62, 63, 64 and 65 have been stamped into the sheet-channel. Of course such parts as come in contact with the hermetic sealing blocks above referred to should remain plane unless plastic sealing materials are used which harden only in situ, as by vulcanizing, or by other chemical action.

Depending on the purpose for which my structural element is to be used, its construction may be still further modified. Where heat insulation is the chief objective, it is better to use many small cellules of very fine gauge, right across the section; and it would be wasteful to increase the depth of the middle ones, especially as the thickness of the plate is frequently limited.

Another example is where resistance to penetration of a foreign body, like a projectile, is the foremost objective. This construction is ideal for such purpose, if properly designed, and offers a resistance many times greater than a solid armour plate of the best alloy-steel. For high nozzle velocities, sheet channels of extremely light gauge are preferred, as their inertia is small and they yield before being punched through. In fact, the action of such plate may be likened to the way a thin wire net fencing behaves, under the force of a bull; it yields but does not break. With a suitable distribution of gauges and sizes of the individual cellules which, in this case, may preferably have a wavy and not a rectilinear contour but in either case a foreign body trying to penetrate into the section will be deforming not only the cellules which are in its way, but a relatively large adjacent area of cellules. Consequently the kinetic or other energy of such foreign body or projectile is quickly used up and its speed of penetration brought to zero before it has penetrated the element.

The factor of utmost important is the light gauge of the individual sections which with projectiles of high velocity, do not become pierced directly and individually, as the projectile moves through the element, but begin to bend or yield or elongate and involve a large mass of cellules in such deformation. This consumes a great deal of energy and therefore has a superior breaking effect on such foreign body.

The great value of my structural elements, as far as resistance to corrosion is concerned, lies in the fact that, behind an outside plate which either is corrosion-resisting or can easily be made so (as by painting or metal spraying), lies a web of little cellules each of which is hermetically sealed in itself. There can be no corrosion where there is no access of air and moisture. Should, however, the outside surface be damaged, for instance the outside wall of a house, should someone drill a hole in it, corrosion can only affect one cell, namely, the one that has been opened up; and not until this one has been destroyed can corrosion proceed any further. This means that there would be many years before any serious damage could be done to a building, if such hole is left unprotected. If the hole is noticed, it can simply be patched up by cement or any suitable means and corrosion immediately stops.

It has been mentioned above that the blocks used for hermetically sealing the sections of a cellule, reenforce it mechanically. If such blocks are suitably disposed, in neighbouring cellules, so as to lie all in one cross section of the plate, then the whole element is reenforced across this section. The blocks can be made use of still for another purpose: Fig. 4 represents a longitudinal section through such plate. 71, 72, 73, etc., are end sealing blocks and 81, 82, 83, etc., are inside sealing blocks. They may be made of metal, wood, cement, Bakelite or any suitable material. If metallic, they may be solid blocks of metal, or stampings, as shown at 91, 93 in Fig. 11 and in Fig. 16; and they may either be welded on one side, when assembling the plate (depending upon the assembly pressure to make the joint sufficiently air-tight), or they may be soldered or brazed or suitable non-metallic filling media or cements may be applied to make the joint absolutely airtight, or other preferably plastic materials may be employed to fill up the pores. One such way is to use a filler which, when heated, vulcanizes or polymerizes and joins with both the sheets of the section and the material of the sealing block, like ebonite or some of the synthetic resin compounds. An ordinary cement, in suitable combinations may also be used.

In any case, such a zone as is indicated at A in Fig. 4, which has thus been reenforced, can be used for the purpose of obtaining a mechanically sound joint between one plate and another, as, in this zone, the plate presents practically a solid section and holes may be drilled in it, bolts put through or any suitable means of connection applied. Forces transmitted locally by such bolts or other means of connection are distributed uniformly to all of the plates and cellules forming parts of the element. The sides of the plates may be similarly reenforced, for this purpose, just the same as the ends.

If vulcanization, or another operation requiring a high temperature, is required to join the sealing blocks with the sheets, it is preferable to do it under conditions of elevated pressure, so that, upon cooling, there will be no partial vacuum within the plate which might impair its mechanical resistance.

Figs. 5, 6 and 8 represent multicellular elements built on the same principle, but with the corrugated sheet sections extending parallel, and not at right angles, to the surface of the elements. To make the drawings clearer, plates with a comparatively small number of cellules are shown; but many more may be used in practice, depending upon the purpose for which the plates are to be used. It will be noticed that this form of plate construction has a decided advantage when equally strong bending moments, both in the direction of the length of the elements as well as at right angles to it, are to be taken up.

Fig. 7 shows such an element still further simplified and consisting only of two external plates and one corrugated sheet in between. Figs. 8, 9 and 10 show one way of making a mechanically solid side-joint, between two elements. Angles 11a and 11, of comparatively heavier gauge, are first inserted and suitable holes punched in the light-gauge cellules. The right-hand side plate (Fig. 8) receives symmetrically the same angles 11 and 11b which are fixed to the cellule sheets preferably by welding. To assemble the two elements it is only necessary to insert the plurality of the projecting hooks 14 into the corresponding slots 17 and push one element longitudinally of the joint so that the tapering portions of the hooks 14 will grip the slots 17 of the other plate. The outside sheets are suitably formed and little channels 10 driven in, to obtain a tight joint.

Fig. 11 shows the method of hermetically sealing and joining end to end two elements like those shown in Fig. 5. It shows them used as roofing plates and attached, at their junction, to a roof beam 97. The individual cellules are sealed by stamped, cast or similar pieces 91, 92, 93, 94, 95, 96 which are brazed or welded in position thereby closing the cells and reenforcing the end portion. Some of the closing cups have projections or have fastened to them elements such as that shown in Figure 15 which are used for bolting and locking the two plates together. These same projections are also used to obtain the joint with the beam 97. The said cups 91 to 96 are made of a heavier metal than the corrugated sheets forming the cellules, so that, although the projections are joined only at several places, across the width of the plates, yet the forces are uniformly transmitted to all the elements of the plates, so that, provided the cups and bolts are strong enough, the joint is not the weakest spot of the structure.

A channel 98, preferably made also of a heavier gauge than the cellules, is inserted into the turned-up edges of the upper sheets of the two plates, and is then pressed tight as by rolling, so as to form a water-tight joint.

When joints are made with the aid of ordinary cement or concrete, this is sufficient, in most cases, for hermetically closing the cellules. The edges of the cellules are simply roughened, or punched, to make the cement hold better, and then concrete is cast over, filling all places outside as well as in the cellules. To prevent cement getting in too far into the cellules, when casting not in a vertical position, suitable plugs may be inserted into each cellule beforehand.

For the most economical use of the sheet metal, elements such as those shown in Figs. 5, 6 and 8 are preferably not made of sheets all of the same gauge. On the contrary, it is preferable to use heavier gauges for the outer sheets 4, 3, 2 and 2', 3', 4' and lighter for the inner sheets 1, 7 and 1'.

By suitably disposing the sheets, this method may also be used for producing curved or bent plates, as shown in Fig. 12 at B.

Ordinary manufacturing methods for such elements will be clear to the skilled worker in the art and need not be described. There are, however, two developments which produce results unobtainable by ordinary methods:

Strip which is cold rolled or drawn in rolls of very small diameters and possesses a high tensile strength but is not too brittle may be employed. Such strip, whether of low or medium carbon content steel, can, for certain purposes, be used without annealing; and its structure resembles one of a steel rope. With the use of such material, it was found that a large number of spot welds of very small diameter give very good results, as such welds are close enough to one another to insure tight joints and the portions annealed through the welds are small enough not to impair the very high mechanical value of the element. Each individual weld does not need to be strong, as they hold only by their great number.

Another development is an economical method of producing elements of the type of Figs. 5 and 6. This is done in conjunction with metal coating machines for strips according to applicant's co-pending application No. 31,699, filed July 16, 1935. The exit side of such apparatus is represented in Fig. 13. 98 is an airtight cooling compartment of an annealing furnace through which pass, while being partially cooled, a number of superimposed strips 91. The furnace has a reducing atmosphere. The strips have undergone a preliminary treatment before they enter the furnace, in that certain portions of them which are not to receive any metallic coating have been given a preventive coat of heat-resisting non-metallic substance such as lime, graphite, magnesia or other, alone or in combination, or containing a binding substance like sodium silicate, clay, etc.

While still within the cooling chamber 98, the strips are separated by being led over pulleys 93 and individually enter a bath of a coating metal, such as cadmium, zinc, bronze or other molten metal, that portion of the bath surface where the strips enter into the bath being protected from contact with the outside air by a suitably shaped exit portion of the cooling chamber, the edges of which are submerged into the metal coating bath.

The strips now travel a certain distance in the bath individually, both surfaces of each strip being in contact with the boating bath. Thus their surfaces obtain a metallic coating, continuous, excepting for the places which have on them the preventive coating above referred to.

The strips now go round the roll 94 while submerged in the coating bath where they are brought together, and move vertically through exit rolls 95 to cooling and shearing means.

It is evident that a partial cross section of such composite strip after cooling will appear as shown in Fig. 14. Outside are the two thicker strips 101 and 102 which, in this process, have incidentally obtained a corrosion-proof outside coating. Inside are the thin sheets 103, 104, 105, 106 brazed to each other, or to the outside strips but only at places indicated at 107.

Such brazed elements can now easily be expanded to form a multicellular plate of the general type of Fig. 6 by gripping one end of a sheared length and introducing a liquid or gas under pressure at the other.

Such treatment, for preventing certain parts of a strip from obtaining a metallic coating, can of course also be used for other purposes, such as for sheets coated on one side only, etc.

In certain instances, I prefer statically to expand the elements while delimiting their outside contour, as by first placing them in a mould. This prevents buckling and allows enough pressure to be applied to iron out any wrinkles that may be produced on the outside surface of the element, especially when the outside sheets are not sufficiently heavy in proportion to the inside sheets. The expansion of the element in thickness necessitates a certain amount of drawing on the part of the inner sheets which become lengthened in the direction of their cross section. Unless the outside sheets are sufficiently heavy to insure this, the whole element may become narrower with resulting wrinkles on the outside sheets. This can be corrected and the wrinkles ironed out during the final stage of expansion within a mould.

Such mould can also be used advantageously in order to produce multicellular plates which are not flat but are curved or varying in thickness etc. The elements have been found to be very plastic during such expansion and can be made to fill different shaped moulds, within certain limits, of course.

Modifications may be made in my invention without departing from the spirit of it. Having thus described my invention, what I claim as new and desire to secure by Letters Patent is:

1. A cellular metal structural element comprising outer face portions, and a plurality of inwardly disposed corrugated metal sheets, so disposed as to cause the corrugations of different sheets to come together to form contiguous cellules in rows, there being between said outer face portions a plurality of such rows of cellules along any cross-sectional line, said cellules being larger at the median line of said element and decreasing in dimensions toward said outer face portions whereby to provide an element having greater strength adjacent its outer faces.

2. A structure as claimed in claim 1 in which said outer face portions comprise outer plain metal sheets, and in which the inwardly disposed corrugated sheets lie substantially parallel with said outer sheets.

3. A structure as claimed in claim 1 in which said cellules are blocked at at least one position along their axes by solid bodies, and at their ends by solid bodies, said last mentioned bodies having a length at least equal to their thickness, whereby each cellule is subdivided into a plurality of non-intercommunicating compartments, and whereby provision is made at the ends of said structural element for cutting said element without opening up the cellules therein.

4. A structure as claimed in claim 1 in which said cellules are blocked at at least one position along their axes by solid bodies and at their ends by solid bodies, said last mentioned bodies having a length at least equal to their thickness, whereby each cellule is subdivided into a plurality of non-intercommunicating compartments, and whereby provision is made at the ends of said structural element for cutting said element without opening up the cellules therein, said bodies being of metal and joined to the cellule walls.

5. A structure as claimed in claim 1 in which said cellules are blocked at at least one position along their axes by solid bodies, and at their ends by solid bodies, said last mentioned solid bodies forming at the ends of said element, with end portions of the cellule walls, plain, transverse solid walls, and means for fastening elements together comprising interlocking means respectively at the ends of the element.

6. A structure as claimed in claim 1 in which said cellules are blocked at at least one position along their axes by solid bodies, and at their ends by solid bodies, said last mentioned solid bodies forming at the ends of said element, with end portions of the cellule walls, plain, transverse solid walls, and means for fastening elements together, said means comprising fittings at each end of said element, said fittings having interspaced parallel walls and angularly bent flanges on said walls, said flanges being adapted to mate with similar flanges of another element and be fastened thereto.

7. A structure as claimed in claim 1 in which said inwardly disposed corrugated sheets are alternated with plain sheets acting to subdivide the cellules and increase the rigidity of the element.

8. A structure as claimed in claim 1 in which said cellules are sealed, in which said outer faces are corrosion resistant and in which the surfaces of certain at least of said inwardly disposed sheets are of reflective character whereby to enhance the heat-insulative character of the element.

9. A structure as claimed in claim 1 in which corrugated portions of said inwardly disposed sheets are transversely corrugated to increase the resistance of the corrugations against buckling.

10. A structure as claimed in claim 1 in which said inwardly disposed corrugated metal sheets lie in planes generally transverse to the width of said face portions, and said inwardly disposed corrugated metal sheets are turned over at their ends to lie generally in the plane of said face portions, the said turned over portions being in lapping relationship and fastened together to form said face portions.

11. A structure as claimed in claim 1 in which said inwardly disposed corrugated metal sheets lie in planes generally transverse to the width of said element, said sheets being bent over at each end, said bent over portions of the assembled sheets lying in lapping relationship, the face portions of said structural element being formed of plain metal sheets, said lapped portions of the inwardly disposed sheets lying against said plain metal sheets and fastened thereto and to each other.

12. A structure as claimed in claim 1 in which said inwardly disposed corrugated metal sheets lie in planes generally transverse to the width of said element, said sheets being bent over at each end, said bent over portions of the assembled sheets lying in lapping relationship, the face portions of said structural element being formed of plain metal sheets, said lapped portions of the inwardly disposed sheets lying against said plain metal sheets and fastened thereto and to each other, said plain metal sheets being corrosion resistant and certain at least of the inwardly disposed sheets having reflective surfaces, whereby to enhance the heat insulating character of the element, the said cellules in said element being sealed.

TADEUSZ SENDZIMIR.